Dec. 17, 1963   G. J. SANDERS   3,114,431
NOISE ATTENUATING APPARATUS OF CIRCULAR CROSS-SECTION
Filed Aug. 15, 1962
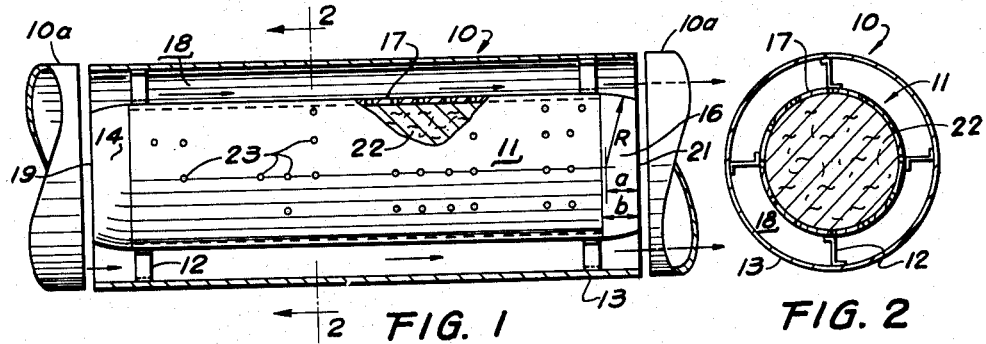
FIG. 1
FIG. 2
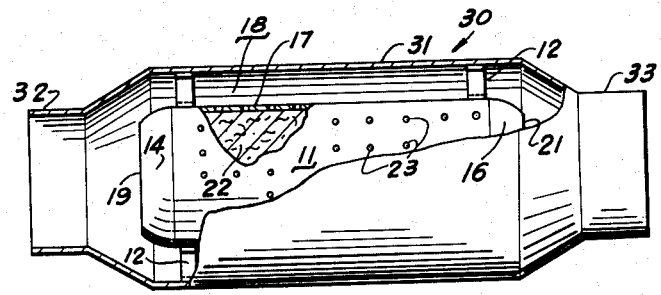
FIG. 3
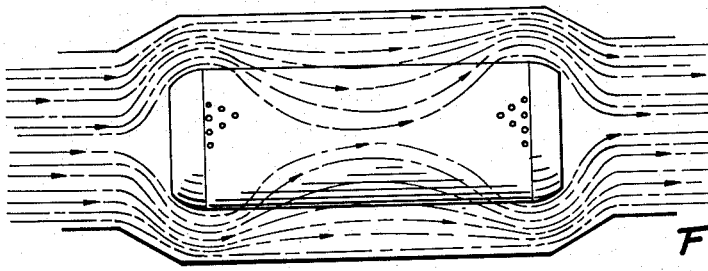
FIG. 4
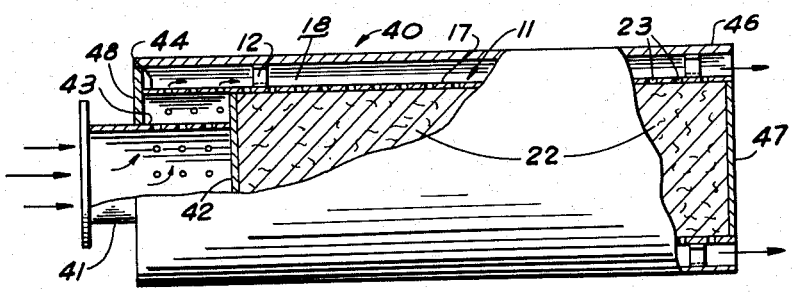
FIG. 5
INVENTOR.
GUY J. SANDERS
BY
Leo J. MaLossi
his ATTORNEY

United States Patent Office 3,114,431
Patented Dec. 17, 1963

3,114,431
NOISE ATTENUATING APPARATUS OF CIRCULAR
CROSS-SECTION
Guy J. Sanders, Severna Park, Md., assignor to Koppers
Company, Inc., a corporation of Delaware
Filed Aug. 15, 1962, Ser. No. 217,069
1 Claim. (Cl. 181—50)

This invention concerns apparatus for attenuating noise carried in a fluid medium whereby high noise attenuation and minimum restriction to air flow are attained without material adverse pressure drop.

The criteria for optimum noise suppression with minimum pressure drop are frequently incompatible because the construction which will provide optimum noise attenuation usually will also produce high pressure drops in the fluid medium as it passes therethrough and those arrangements which will provide negligible pressure drops generally prove ineffectual in producing good sound attenuation.

In general, the prior art structures for the attenuation of sound in a fluid medium flowing within the confines of a duct either employ absorptive materials as inner linings for such ducts; use resonant chambers, or employ baffles containing absorptive materials so arranged in the duct as to force the fluid medium along a tortuous path.

In the transmission of a fluid medium along a duct, it is important to minimize drops in pressure which typically accompany any restriction to the flow of the fluid medium since overcoming such drops in pressure require the employment of unnecessarily large pumps or fan units, as the case may be, involving higher initial costs as well as higher operating costs for such installations.

Accordingly, the object of the present invention is the provision of a silencing device of circular cross-section and relatively short in length providing a narrow acoustic passage presenting minimal restriction to the flow of the fluid medium.

The above object is achieved in the present invention by conducting the fluid medium through a smooth, unlined duct of circular cross-section having a bullet-shaped body filled with sound absorbing material mounted in the center thereof which central body has a perforated shell and closed ends whereby the fluid flowing in the duct is confined to a relatively narrow annular passage between the central body and the unlined duct.

Other objects and many of the attendant advantages of this invention will be readily appreciated as the same becomes better understood by reference to the following detailed description when considered in connection with the accompanying drawings in which like reference numerals designate like parts throughout the figures thereof and wherein:

FIG. 1 illustrates the present invention as it would be employed in connection with an installation in which ultra-high aerodynamic flow characteristics need not be maintained and the diameter of the inlet and outlet ducts are the same as that of the silencer;

FIG. 2 shows a view taken through line 2—2 of FIG. 1;

FIG. 3 illustrates the use of the present invention in a duct wherein the design necessitates ultra-high aerodynamic flow characteristics and it becomes necessary to increase the diameter of the duct;

FIG. 4 is a schematic representation of the flow pattern of the sound waves in the fluid medium passing through the silencer unit and FIG. 5 illustrates an application of the present invention in the treatment of a stream of fluid medium traveling at such high speeds as to seriously erode the contents of the center body.

The silencer unit 10 of circular cross-section shown in FIGS. 1 and 2 illustrates the construction of the present invention which would be employed as an insert into a duct 10a connected at either end thereof and having the same diameter as that of silencer 10. Silencer 10 may, of course, be employed in connection with conventional square or rectangular ducts in which case transition sections are employed to change the cross section to conform to that of silencer 10. This is an example of the straight through circular silencer particularly useful in high pressure air conditioning systems.

Mounted within silencer 10 and concentric therewith is the blunt-nosed cylindrical body 11 held in position by Z-clips 12 in spaced relation with the inside of imperforate unlined circular duct 13 and cylindrical body 11 is provided with front and rear imperforate dish-shaped portions 14, 16 closing the ends of the perforated shell 17. All structural elements (12, 13, 14, 16 and 17) are preferably of sheet metal although they may be made of other conventional construction materials. Both the front and rear portions 14, 16 are curved as shown to provide effective transition of the fluid stream from the full cross-sectional area of duct 10a to the area of restricted annular passage 18.

As is true in most acoustical devices, the relationship of the various elements of the present invention to one another in size and location are important for obtaining optimum operating conditions and these relationships will be defined in greater detail below.

Contrary to the accepted theories of aerodynamics for sub-sonic flow the rounding off of the front and rear portions 14 and 16 is rather scant, with the blunt-nose of front portion 14 comprising in large part the flat imperforate face 19 and with the greater part of the cross sectional area of rear portion 16 being shaped as flat imperforate face 21. Thus, unexpectedly no great loss is experienced in pressure head in either constriction or reexpansion of the fluid medium as the flow passes imperforate blunt front portion 14, perforate shell 17 and rear portion 16 with a relatively insignificant amount of turbulence.

Thus, as it approaches front end portion 14 the fluid stream is quickly deflected and confined as it is introduced into annular passage 18 of reduced cross sectional area wherein the sound attenuation is effected along the central core of the stream of fluid medium by means of packing 22 of sound-absorbing material, which material may be glass fiber or other conventional acoustical materials. Since the sound treatment is limited to the inner surface of the annular-shaped stream as it passes through silencer 10, the inner surface of duct 13 remains completely free of drag-inducing material and a minimum of resistance to flow is offered to the passage of the medium through silencer 10. It is believed that the blunt solid construction of the end portions 14 and 16 contribute markedly to the effectiveness of this center construction making possible efficient sound attenuation in a relatively short silencer unit without the need of a lining of acoustical material on the inner surface of duct 13 conventionally employed to acoustically treat the fluid stream along a plurality of contact surfaces. This feature in turn accounts for the increase in the effectiveness of silencer 10 to treat and convey a fluid stream with a substantially reduced pressure (static) drop.

The manner in which non-perforated end portions 14, 16 contribute to the increase in the acoustical efficiency of silencer 10 is best illustrated by reference to FIG. 4 wherein flow lines schematically represent the passage of sound energy through silencer 10. As the flow lines (sound waves) approach and pass front end portion 14 the sound waves are physically constricted because of the imperforate nature of the surface. When the sound waves move past end portion 14 these sound waves are free to enter central body 11 through perforated sheet 17 as shown by the flow lines whereupon the intensity of these sound waves is greatly reduced. Then nearing end portion 16 it once again becomes necessary for the flow lines to be drawn together since imperforate end portion 16 forces constriction of the sound waves (now of greatly diminished energy content) until re-expansion of the flow lines is made possible after passing end portion 16.

While the flow lines of FIG. 4 represent schematically the path of the sound waves they do not represent the movement of the fluid medium itself. Although some fluid medium does enter center body 11 through shell 17 the penetration thereof by the fluid medium is discouraged by the size and number of the holes and by the interposition of a wire gauze (not shown) or glass fiber fabric (not shown) between packing 22 and the inner surface of shell 17 which serves to minimize erosion of packing 22 by the fluid stream.

As an example of typical dimensions for the embodiment described in FIGS. 1 and 2 dimension $a$ is equal to one half the difference between the inner diameter of duct 13 and the outer diameter of body 11; dimension $b$ is equal to dimension $a$ plus one half inch; the outer diameter of body 11 is equal to .633 times the inner diameter of duct 13 and radius R is equal to one half the outer diameter of body 11. These dimensions produce a structure with an acoustically and aerodynamically open area for annular passage 18 in the desirable range between 30 and 70%. As a clarifying note, the definition of acoustically open area is the ratio of the cross-sectional area of the annular flow passage through the silencer to the total cross-sectional area of the silencer unit; the definition of aerodynamic open area is the ratio of the cross-sectional area of the annular flow passage through the silencer to the cross-sectional area of the inlet duct. In the case in which the diameter of the inlet duct and the diameter of the silencer are equal as in FIG. 1 the acoustically open area is equal to the aerodynamically open area.

In the design of silencers similar in principle to that of the embodiment shown in FIG. 1 wherein a higher aerodynamic open area is required than can advantageously be produced with a straight-through silencer, the embodiment shown in FIG. 3 is used. Therein silencer 30 has an outer imperforate shell 31 of circular cross-section and larger in diameter than the diameter of inlet duct 32. Suitable transition pieces connect shell 31 with inlet duct 32 and outlet duct 33. The diameter of central body 11 is adjusted to provide the desired cross-sectional area for annular passage 18 in such relation to the area of inlet duct 32 and silencer 30 that an acoustically open area in the range of 30 to 60% (of the area of silencer 30) and an aerodynamically open area in the range of 40 to 80% (of the area of inlet duct 32) are produced.

In all other respects the construction of the silencer 30 is in accord with the structure described above in connection with FIGS. 1 and 2.

A device of the configuration disclosed in FIG. 3 wherein the inner diameter of inlet duct 32 is 12″; the inside diameter of shell 31 is 16″; the outside diameter of central body 11 is 12″; the length of the silencer 30 is 2′0″; the length of each transition piece shown is 4″; the length of perforated shell 17 is 20″ and front and rear end portions 14 and 16 are 2⁹⁄₁₆″ deep (the curved portion thereof having a radius of 3⁷⁄₁₆″) will be 44% open acoustically and 78% open aerodynamically.

A particularly important aspect of all embodiments of the present invention is that the cross-sectional area of the exit passage from the silencer unit is at least as great as the cross-sectional area of the annular passage for the fluid medium through the silencer unit and the sound waves in the fluid medium are physically constricted at least two times during passage through the silencer unit with a minimum of distortion of the flow path of the fluid medium itself.

As a result of the effectiveness of the sound attenuation provided by the acoustically lined closed-ended central body 11 there is no need for additional acoustical material on the inner surface of the outer shell of the silencer unit. Thus, two factors contribute to enhancing the aerodynamic characteristics of the novel silencer unit of the present invention first, the reduced surface friction to which the confined fluid medium is exposed in narrow annular passage 18 and second, the shortened length of the silencer unit due to the high efficiency of the acoustical treatment afforded by the central body 11.

It is particularly desirable that the annular passage 18 be maintained relatively narrow to optimize the acoustical treatment during the passage of the fluid medium therethrough and in this regard the diameter of body 11 should be in the range from about .40 to .80 of the inner diameter of the outer shell of the silencer unit. In both embodiments shown (FIGS. 1 and 3) the fluid medium is exposed to some degree of confinement beyond that experienced by the fluid medium in the duct to which the silencer unit is connected, the cross sectional area in the zone of sound attenuation being deliberately constricted.

For most purposes the perforations 23 in shell 17 are evenly distributed and are present in sufficient number so that their total area represents from 10% to about 35% of the area of shell 17. The diameter of the holes 23 should be small enough so that the absorbing material forming packing 22 in shell 17 will not be easily eroded therethrough by the fluid medium as it passes through annular passage 18. In those instances in which the fluid medium is moving at a very high velocity means must be provided for minimizing the eroding effect of the fluid medium as will be shown hereinafter in connection with the structure illustrated in FIG. 5.

In connection with the muffler structure disclosed in FIG. 5 the high velocity fluid medium entering silencer 40 through inlet duct 41 is abruptly deflected by the solid front end plate 42 and passes through perforated cylinders 43 and 44 before entering annular passage 18. As shown, perforated cylinder 43 may be an extension of inlet duct 41 and perforated cylinder 44 may be an extension of perforated shell 17 or these elements may be separate pieces mounted in the silencer 40 in the relative positions shown. The function of screens or perforated cylinders 43 and 44 is to decrease the velocity of the fluid medium and minimize erosion of packing 12.

The construction of the central body and its arrangement relative to outer imperforate shell 46 are retained in this muffler embodiment; to wit, the exit area from the silencer 40 is no smaller in cross-section than the area of passage 18 and at least two physical constrictions of the sound waves occur in silencer 40. In this embodiment as well the sound treatment of the stream of fluid medium is limited to the centermost portion thereof obviating the placement of drag-inducing acoustical material on the inner surface of the outer shell 46 of the silencer 40. Solid rear end plate 47 functions in the same fashion as portion 16 of the first embodiment. In contrast to the embodiments of FIGS. 1 and 3, however, the aerodynamic open area is in the range of 200 to 1000% (expansion, rather than constriction occurs) while the acoustical open area is in the range from about 25 to 75%. In this case the stream of fluid medium is discharged to the atmosphere as shown by the arrows in FIG. 5.

A specific structure having dimensions such that the distance from header 48 to front end plate 42 is equal to one-half the inner diameter of outer shell 46; the length of center body 11 is equal to three times the inner diameter of outer shell 46 and the outer diameter of body 11 is equal to 75% of the inner diameter of outer shell 46 will yield an acoustical open area of 43%.

The feature of non-reduction of cross sectional area of the fluid stream upon exit from the silencer has been specifically retained in all embodiments disclosed herein because it has been discovered that if the fluid medium exits from the silencer passage 18 with too high a velocity (a condition that would be promoted by reducing the area of the exit from the silencer) noise is regenerated and the beneficial performance of the silencer is reduced.

Thus, the present invention provides a series of novel constructions productive of a narrow acoustic passage of increased efficiency in sound reduction having a minimum of loss in static pressure in the flow stream.

Obviously modifications and variations of the present invention are possible in the light of the above teachings. It is therefore to be understood, that within the scope of the appended claim, the invention may be practiced otherwise than specifically described.

What is claimed is:

An acoustical device for attenuating the noise that may be transmitted by an air stream flowing through a conduit comprising:

a. an imperforate cylindrical shell having a smooth non-porous inner surface,
b. a perforate cylindrical shell having an outside diameter that is smaller than the inside diameter of said imperforate shell,
c. means for mounting said perforate shell concentrically within said imperforate shell so that the outside of said perforate shell and the inside of said imperforate shell are defining a longitudinal extending zone of annular cross-section whose aerodynamically open area is in the range of from about 40 to 80% and whose acoustically open area is in the range of from 30 to 60%,
d. sound absorbing material deposited within said perforate shell,
e. imperforate closure means at each end of said perforate shell and extending transversely across the axis of said shell and having a diameter smaller than the diameter of said perforate shell, and
f. imperforate means joining said closing means and said perforate shell to give a blunt-nosed bullet appearance thereto and to provide for the aerodynamically streamlined flow of air to said perforate shell thereby providing effective transition of the air stream from the full cross-sectional area of the conduit to the smaller area of the annular zone.

References Cited in the file of this patent

UNITED STATES PATENTS

| | | |
|---|---|---|
| 1,811,762 | Schnell | June 23, 1931 |
| 2,233,804 | Bourne | Mar. 4, 1941 |
| 2,613,758 | Cullum | Oct. 14, 1952 |

FOREIGN PATENTS

| | | |
|---|---|---|
| 1,226,438 | France | Feb. 29, 1960 |